April 25, 1961

H. C. HADLEY 2,981,260

CORN HUSKER

Filed Sept. 5, 1958

INVENTOR.
H. C. HADLEY

April 25, 1961  H. C. HADLEY  2,981,260
CORN HUSKER
Filed Sept. 5, 1958
2 Sheets-Sheet 2
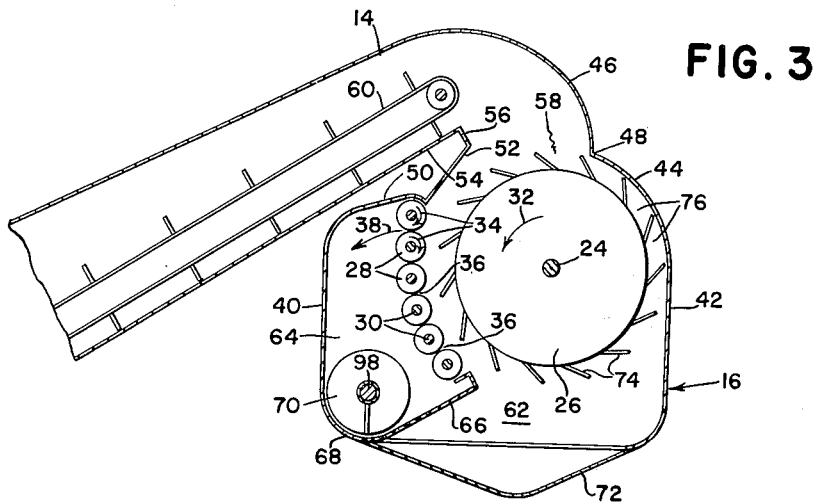
FIG. 3
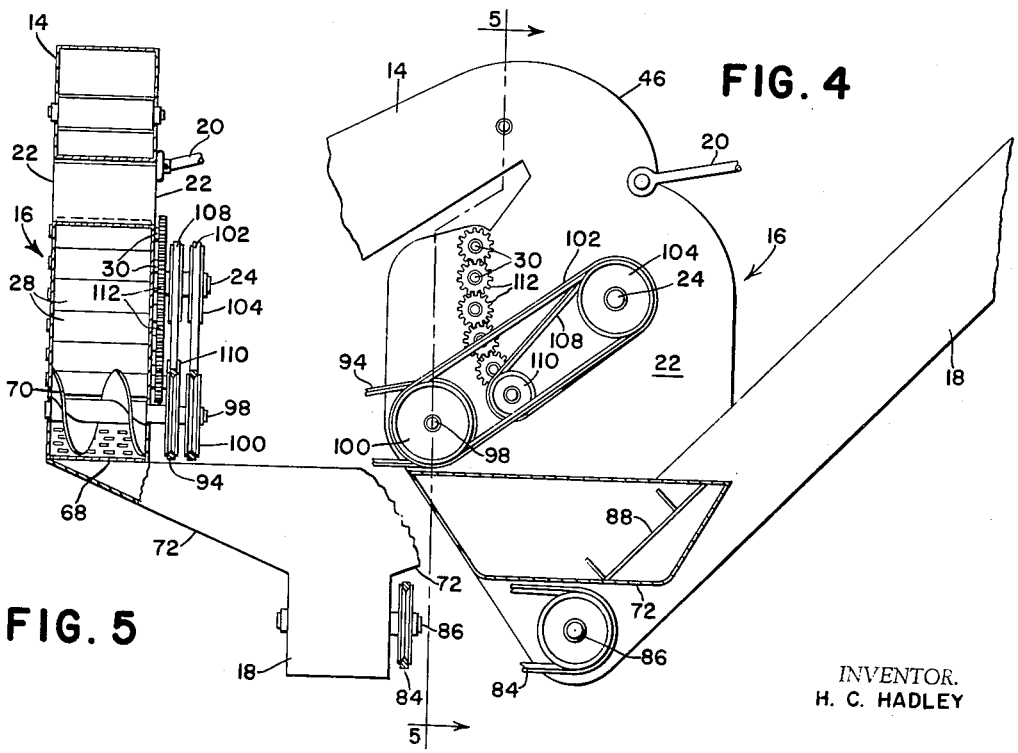
FIG. 4
FIG. 5
INVENTOR.
H. C. HADLEY

United States Patent Office 2,981,260
Patented Apr. 25, 1961

2,981,260
CORN HUSKER
Howard C. Hadley, Des Moines, Iowa, assignor to Deere & Company, Moline, Ill., a corporation of Delaware
Filed Sept. 5, 1958, Ser. No. 759,291
9 Claims. (Cl. 130—5)

This invention relates to a corn husker and more particularly to an improved corn husker in which a drum is cooperative with an arcuate row of husking roll arranged in concave fashion relative to the drum. While arrangements of the general character referred to are known, none of them rely on exactly the same husking principles as disclosed in the present invention, which features the location of the arcuate row of husking rolls primarily directly ahead of the drum, together with flexible ear-engaging means on the drum for causing contact between the ears and the husking rolls. Other features of the invention reside in ear-receiving compartment means separated from husk-receiving compartment means by a perforated partition through which shelled corn or kernels may escape from the latter to the former for commingling with the ears for ultimate delivery to a receptacle or other transfer point.

The foregoing and other important objects and desirable features inherent in and encompassed by the invention will become apparent as a preferred embodiment is disclosed, by way of example, in the ensuing description and accompanying sheets of drawings, the several figures of which are described below.

Fig. 3 is a section on the line 3—3 of Fig. 2.

Fig. 4 is a section on the line 4—4 of Fig. 2.

Fig. 5 is a section substantially on the line 5—5 of Fig. 4.

Figure 1:
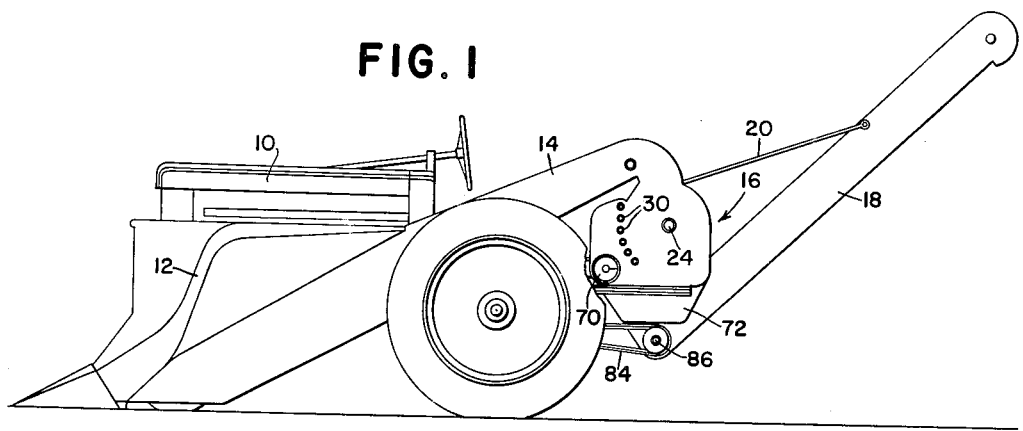
Fig. 1 is a side elevation, on a reduced scale, of a tractor-mounted corn picker incorporating the improved husker as part thereof.
Figure 2:
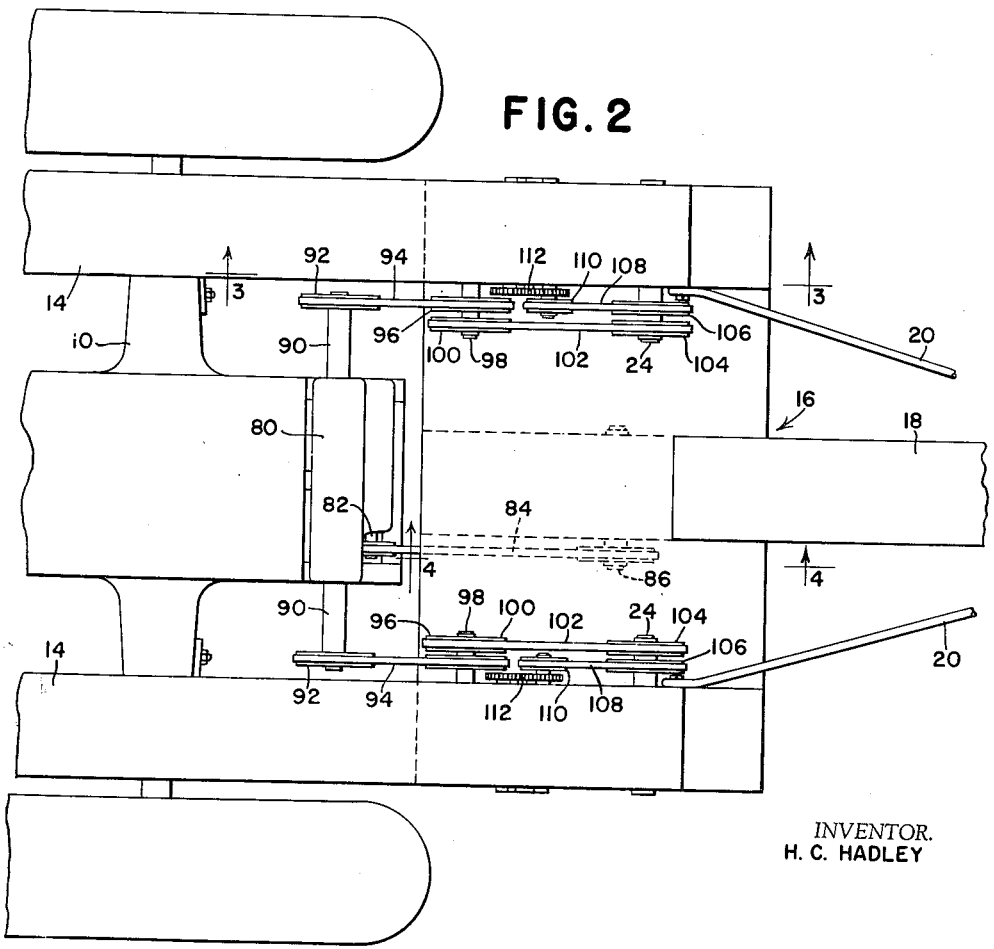
Fig. 2 is an enlarged plan of the rear portion of the machine shown in Fig. 1.

The environment in which the invention is illustrated embodies a conventional tractor-mounted corn picker in which a tractor, as at 10, affords a mobile support for the picker, which includes gathering means 12 discharging to first elevator means, which in this case, since the picker is of the two-row type, includes a pair of upwardly and rearwardly inclining first elevators 14, spaced laterally apart and substantially centered on the tractor body. These elevators discharge at their rear ends to the husking mechanism, denoted in its entirety by the numeral 16, and husked ears and shelled corn are conveyed from the husker by a typical rearwardly and upwardly inclined wagon elevator 18, suitably braced to the husker by braces 20.

The husker includes companion or symmetrical huskers, one for each first elevator. Since these are alike, only one will be described.

Each husker includes support means having opposite upright fore-and-aft laterally spaced apart side walls 22 which journal a transverse drum shaft 24. This shaft carries a relatively large diameter husking drum 26 ahead of which are several husking rolls 28 carried respectively on transverse horizontal husking roll shafts 30 arranged as an arcuate row or concave directly ahead of the drum 26. Each roll is of relatively small diameter as compared to the drum 26. The drum rotates in the direction of the arrow 32, and the rolls are paired, as is typical, to rotate in the directions of the arrows 34, so that the rolls of each pair turn forwardly toward each other, presenting to the drum 26 a rearward bite 36, and each pair of rolls discharging forwardly as at 38. The arcuate or angular extent of the row of rolls 28 is confined primarily directly ahead of the drum 26, and in the preferred embodiment illustrated, the angle is approximately 75° as measured about the drum axis. This angle could, of course, be varied between 50° and 120°, depending upon the characteristics of the feeding mechanism, one example of which will be described below. Significant factors in this respect involve the direction and volume of feeding to the arcuate space between the drum and rolls and the direction and manner of discharge of the husked ears from this space.

In the present case, the support means, previously described as including the upright side walls 22, is augmented by front and rear walls 40 and 42. The latter extends upwardly and is curved forwardly at 44 to adjoin a rearwardly and downwardly curved wall portion 46 of the associated first elevator housing 14, the two meeting at a transverse rear edge or junction 48. The front wall 40 is spaced a substantial distance ahead of the row of rolls and has an upper and rearwardly directed portion 50 which adjoins an upwardly and rearwardly inclined guide plate 52. This guide plate is joined or otherwise associated with a lower wall 54 of the first elevator 14 at a transverse front edge or junction 56. The two edges 48 and 56 define the front and rear edges of a feed inlet opening 48 by means of which the first elevator conveyor 60 discharges downwardly to the drum, and the fore-and-aft distance between these edges or the fore-and-aft dimension of the inlet 58, is less than the diameter of the drum, which controls the volume of ears as well as the flow thereof to the arcuate space between the husking rolls and the husking drum. The flow of ears is further augmented by the guide plate 52, so that the ears are caused to move forwardly past the rolls and downwardly to a lower portion of the supporting means which affords a husked-ear compartment 62. The direction of flow of the ears is the same as that of the direction of rotation of the drum 26 (arrow 32), which thus facilitates feeding of the ears past the rolls 28. As the rolls are so fed, husks are removed therefrom and are discharged in the direction of the arrow 38 to a forward portion of the support means which, as constituted in part by the front wall 40, defines a husk-receiving compartment 64. The compartments 62 and 64 are separated by a perforated partition 66 which extends downwardly and forwardly from the lowermost of the husking rolls to continue into the wall 40 as a husk trough 68 which carries a transverse husk auger 70 for moving the husks laterally outwardly as best shown in Fig. 5. The under portion of the box-like structure which constitutes the support means made up of the several walls already described includes a laterally inwardly and downwardly inclined floor 72 (Fig. 5) which leads to the lower part of the wagon elevator 18. The structure is duplicated at both sides so that both huskers funnel into the wagon elevator. The husk augers 70 operate in opposite directions so that the husks are discharged laterally outwardly and externally of the machine.

Another feature of the invention is the provision of means on the drum 26 affording a plurality of flexible or resilient paddle elements 74. These are preferably formed of rubber or rubber-fabric structure, such as is obtained from the carcass of a vehicle tire. The paddle elements are circumferentially spaced about the drum and thus each pair of neighboring paddle elements affords an ear-engaging pocket 76 therebetween. The paddles are inclined circumferentially in the direction of rotation of the drum, and their immediate effect in the zone of the inlet 58 is to impel the ears forwardly. As the drum rotates past the row of rolls, the paddle elements can yield and at the same time can press the ears against the rolls with sufficient force to enable the rolls to remove husks from the rolls without undesirable shelling.

The husker and wagon elevator are driven from the tractor by any suitable drive means, representative of which, as shown here, is a rearwardly mounted gear box 80 having a transverse shaft 82 provided with a sheave that is connected by a belt 84 to a sheave on a shaft 86 at the lower end of an endless conveyor 88 in the wagon elevator 18. The gear box further includes a pair of laterally outwardly extending shafts 90 which carry sheaves 92 connected by belts 94 to sheaves 96 on shafts 98 that respectively carry the husk augers 70. Each shaft 98 carries a second sheave 100 which is connected by a belt 102 to a sheave 104 keyed to the associated drum shaft 24.

Each drum shaft carries a second sheave 106 which is connected by a belt 108 to a smaller sheave 110 on the lowermost husking roll shaft 30. This shaft, as well as the other shafts 30, respectively carry meshing gears 112 which serve to drive the husking rolls in the indicated directions.

Features of the invention in addition to those specifically outlined will readily occur to those versed in the art, as will obvious variations and alterations in the preferred embodiment disclosed, all of which may be achieved without departure from the spirit and scope of the invention.

What is claimed is:

1. A corn husker, comprising: a support means including a pair of upright fore-and-aft laterally spaced apart side members; a husking drum of relatively large diameter journaled between the side members on a transverse axis; a plurality of pairs of parallel transverse husking rolls of relatively small diameter journaled by the members directly ahead of the drum and arranged on an arc concentric with the drum and confined to an angular area on the order of approximately 50° to 120° as measured about the drum axis; means for rotating the drum so that its periphery travels downwardly past the rolls; means for rotating the rolls in pairs so that the rolls of each pair turn forwardly toward each other to present an inlet bite facing the drum and to discharge husks forwardly; and corn ear inlet means at the top of said structure and so constructed as to feed corn ears directly downwardly to the top of the drum to be carried forwardly to and downwardly over the rolls, whereby the husked ears are discharged downwardly past the lowermost of the rolls and the husks are discharged forwardly of the rolls.

2. The invention defined in claim 1, including: means providing a plurality of corn-ear-engaging pockets on and spaced circumferentially about the periphery of the drum.

3. The invention defined in claim 2, in which: said pocket-providing means comprises a plurality of circumferentially spaced flexible paddle elements, each neighboring pair of elements defining a pocket.

4. The invention defined in claim 3, in which the paddle elements are inclined in the direction of rotation of the drum.

5. The invention defined in claim 1, including: means on the drum providing a plurality of circumferentially spaced resilient ear-engaging elements.

6. The invention defined in claim 5, in which: the elements are inclined in the direction of rotation of the drum.

7. The invention defined in claim 1, in which: the inlet means includes a front and rear transverse inlet-defining portion above the drum and spaced apart fore-and-aft a distance less than the diameter of the drum, said front portions being disposed rearwardly of and above the uppermost of the rolls, and a guide plate extending forwardly from said front portion to said uppermost of the rolls.

8. The invention defined in claim 1, including: means defining a husk-receiving compartment ahead of the rolls for receiving husks from said rolls.

9. The invention defined in claim 1, including: means defining a husk-receiving compartment ahead of the rolls for receiving husks from said rolls; means defining a husked ear compartment below the drum and rolls; and a perforated partition between said compartments enabling the passage of kernels from the husk-receiving compartment to the husked ear compartment.

References Cited in the file of this patent

UNITED STATES PATENTS

| | | |
|---|---|---|
| 45,387 | Case | Dec. 13, 1864 |
| 1,880,482 | Raney et al. | Oct. 4, 1932 |
| 1,927,957 | Sells et al. | Sept. 26, 1933 |
| 2,845,932 | Jones | Aug. 5, 1958 |